(12) United States Patent
Manole et al.

(10) Patent No.: US 8,115,149 B1
(45) Date of Patent: Feb. 14, 2012

(54) GUN LAUNCHED HYBRID PROJECTILE

(75) Inventors: Leon R. Manole, Great Meadows, NJ (US); Ernest L. Logsdon, Jr., Newton, NJ (US); Mohan J. Palathingal, Oradell, NJ (US); Anthony J. Sebasto, Budd Lake, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 192 days.

(21) Appl. No.: 12/506,579

(22) Filed: Jul. 21, 2009

(51) Int. Cl.
*F41G 7/30* (2006.01)
*F42B 15/01* (2006.01)
*B64C 13/20* (2006.01)
*F41G 7/00* (2006.01)
*F42B 15/00* (2006.01)

(52) U.S. Cl. ...... 244/3.14; 244/3.1; 244/3.11; 244/3.24; 244/34 R; 244/35 R; 244/45 R; 244/46; 244/49; 244/75.1; 244/76 R; 244/175; 244/189; 244/190; 102/430

(58) Field of Classification Search ............ 244/3.1–3.3, 244/34 R, 35 R, 45 R, 46, 49, 62, 63, 117 R, 244/119, 120, 75.1, 76 R, 175, 189, 190; 89/1.11; 102/374–381, 430, 473, 482, 501, 102/517

See application file for complete search history.

(56) References Cited

U.S. PATENT DOCUMENTS

| | | | | | |
|---|---|---|---|---|---|
| 2,769,601 | A | * | 11/1956 | Hagopian et al. | 244/3.14 |
| 2,992,794 | A | * | 7/1961 | Boyd | 244/3.15 |
| 3,337,161 | A | * | 8/1967 | Halton | 244/3.14 |
| 3,469,260 | A | * | 9/1969 | Holt | 244/3.14 |
| 3,557,304 | A | * | 1/1971 | Rue et al. | 244/3.14 |
| 3,564,134 | A | * | 2/1971 | Rue et al. | 244/3.14 |
| 3,567,163 | A | * | 3/1971 | Kepp et al. | 244/3.14 |
| 3,721,410 | A | * | 3/1973 | Anspacher | 348/144 |
| 3,724,783 | A | * | 4/1973 | Nolan et al. | 244/3.15 |
| 3,778,007 | A | * | 12/1973 | Kearney et al. | 244/3.14 |
| 5,615,847 | A | * | 4/1997 | Bourlett | 244/63 |
| 6,056,237 | A | * | 5/2000 | Woodland | 244/3.15 |
| 7,185,846 | B1 | * | 3/2007 | Bittle et al. | 244/3.28 |
| 7,472,866 | B2 | * | 1/2009 | Heaston et al. | 244/63 |
| 7,679,037 | B2 | * | 3/2010 | Eden et al. | 244/3.1 |

* cited by examiner

*Primary Examiner* — Bernarr Gregory
(74) *Attorney, Agent, or Firm* — Michael C. Sachs

(57) ABSTRACT

A Hybrid Projectile is provided for delivering an explosive payload to a target wherein the Hybrid Projectile may be steered in flight using relatively inexpensive means. The Hybrid Projectile is exteriorly configured in the same physical exterior configuration of conventional ammunition of various standard types so it can be launched in conventional manner from the same weapon systems. However, internal features allow the Hybrid Projectile to be transformed in flight from a command signal to deploy wings and fins, and in some projectiles to telescope open to deploy such wings and fins. An inexpensive televisual means is activated in the fore region of the round which through RF uplink command can be used to select a path, while motors on the wings can then be used to more precisely glide the projectile to a target, or otherwise to abort the target run.

6 Claims, 7 Drawing Sheets

GUN LAUNCHED HYBRID PROJECTILE

U.S. GOVERNMENT INTEREST

The inventions described herein may be made, used, or licensed by or for the U.S. Government for U.S. Government purposes.

BACKGROUND OF INVENTION

Currently, projectiles are fired (gun launched) from military guns to defeat targets such as enemy soldiers, buildings and vehicles. These projectiles depend on either an energetic in the projectile, defeating the target with projectile shrapnel or blast overpressure, or by the kinetic energy of the projectile. Grenade, Shoulder Launched, Tank, Mortar, and Artillery projectiles may also be fired to defeat targets. A projectile can carry a heavy payload of high explosives, and is cannon launched with great force, so the projectile can travel up to long distances (such as 10 miles, e.g.) and deliver the destructive payload to the target. However, such projectile essentially cannot be steered in flight or recalled once launched. This lack of steering is with the possible exception of prohibitively expensive current proposed systems. Some of the new mortar and artillery projectiles have thrusters or canards that provide course correction capability. However, they require sophisticated programming, electronics, sensors, and seekers to define, select, then to hit a target; they therefore are extremely expensive. These guided projectiles do not pass visual information back to the user (the soldier). These projectiles cannot be recalled and do not allow the user to select target based on visual information. They are also much larger and heavier than existing projectiles of the same caliber. They do not have the appearance and shape of the existing projectile of the same caliber. By contrast an unmanned air vehicle (UAV) which can be tube or hand launched can be steered while in flight, however essentially a UAV cannot carry the desired heavy payloads of high explosives, moreover the UAV requires large motorized propellers which take space, consume large energy, may require batteries, and usually make noise which makes them easy to detect and track. The UAV takes a long time to reach the target and can be blown off course by the wind, e.g., the hand or tube launched UAV does not have the appearance and shape of an existing projectile of the same caliber. They cannot complete the same mission as conventional ammunition or the missions of the hybrid type projectile of this invention.

BRIEF SUMMARY OF INVENTION

This Hybrid Projectile invention utilizes the best inherent features of existing projectiles while adding a simple comparatively less expensive feature for glide steering. This can be accomplished by transforming the projectile in flight (on command), having the projectile deploy wings and fins which can be simply used to glide and further steer the projectile. The projectile, includes simplified TV means in the fore that can be ground monitored, and the projectile can be ground commanded through an RF link to glide and selectively thus "flown" (using a joystick or the like). Gun launching or shoulder launching the Hybrid Projectiles utilizes the dramatic energy from the gun launch to get the projectile to targets, within a few seconds, or utilize the shape change at apogee to get a Hybrid Projectile to a great distance in a fraction of the time of a hand or tube launched UAV. Due to the energy of the gun, a much bigger lethal and non-lethal payload, per UAV aerodynamics, can be delivered to the target at greater distances than conventional ammunition or projectiles. If not chosen to so transform the projectile in flight, then the projectile would ordinarily continue on its routine flight to a target, as is usual for that projectile. The soldier can use this Hybrid Projectile of selected caliber alongside of, or in place of, existing Grenade, Shoulder Launched, Tank, Mortar, and Artillery projectiles. The user may set the projectile's fuze prior to launch for a mode of not to transform; and this will result in the ordinary use of that projectile, from launch to target without guidance as in this invention.

OBJECTS OF THE INVENTION

It is an object of the present invention to provide a Hybrid Projectile for delivering an explosive payload to a target, utilizing an adaptation of existing 40 MM grenade projectile rounds, and adaptations of existing 66 MM, 83 MM, or 84 MM shoulder launched projectiles.

It is another object of the present invention to provide a Hybrid Projectile for delivering an explosive payload to a target wherein the Hybrid Projectile may be steered in flight using relatively inexpensive means, and;

It is a further object of the present invention to provide said Hybrid Projectile to as close as practical be exteriorly configured in the same physical exterior configuration of conventional ammunition, and;

It is a still further object of the present invention to provide said Hybrid Projectile to be exteriorly configured in the configuration of conventional caliber mortar projectiles, and;

It is a yet further object of the present invention to provide said Hybrid Projectile to be exteriorly configured in the configuration of conventional caliber telescoping projectiles, and;

It is another object of the present invention to provide said Hybrid Projectile to be exteriorly configured in the configuration of conventional large caliber ammunition cartridges, and;

It is still another object of the present invention to provide a Hybrid Projectile which in flight can be commanded to deploy wings and fins for gliding said Hybrid Projectile through uplink remote commands, and;

A yet further object of the present invention is to have a selectable fuze feature on the Hybrid Projectile where a soldier can set mission as ordinary or guided.

These and other objects, features and advantages of the invention will become more apparent in view of the within detailed descriptions of the invention and in light of the following drawings. It should be understood that the sizes and shapes of the different components in the figures may not be in exact proportion and are shown here for visual clarity and for purpose of explanation.

DETAILED DESCRIPTION

Figure 3:
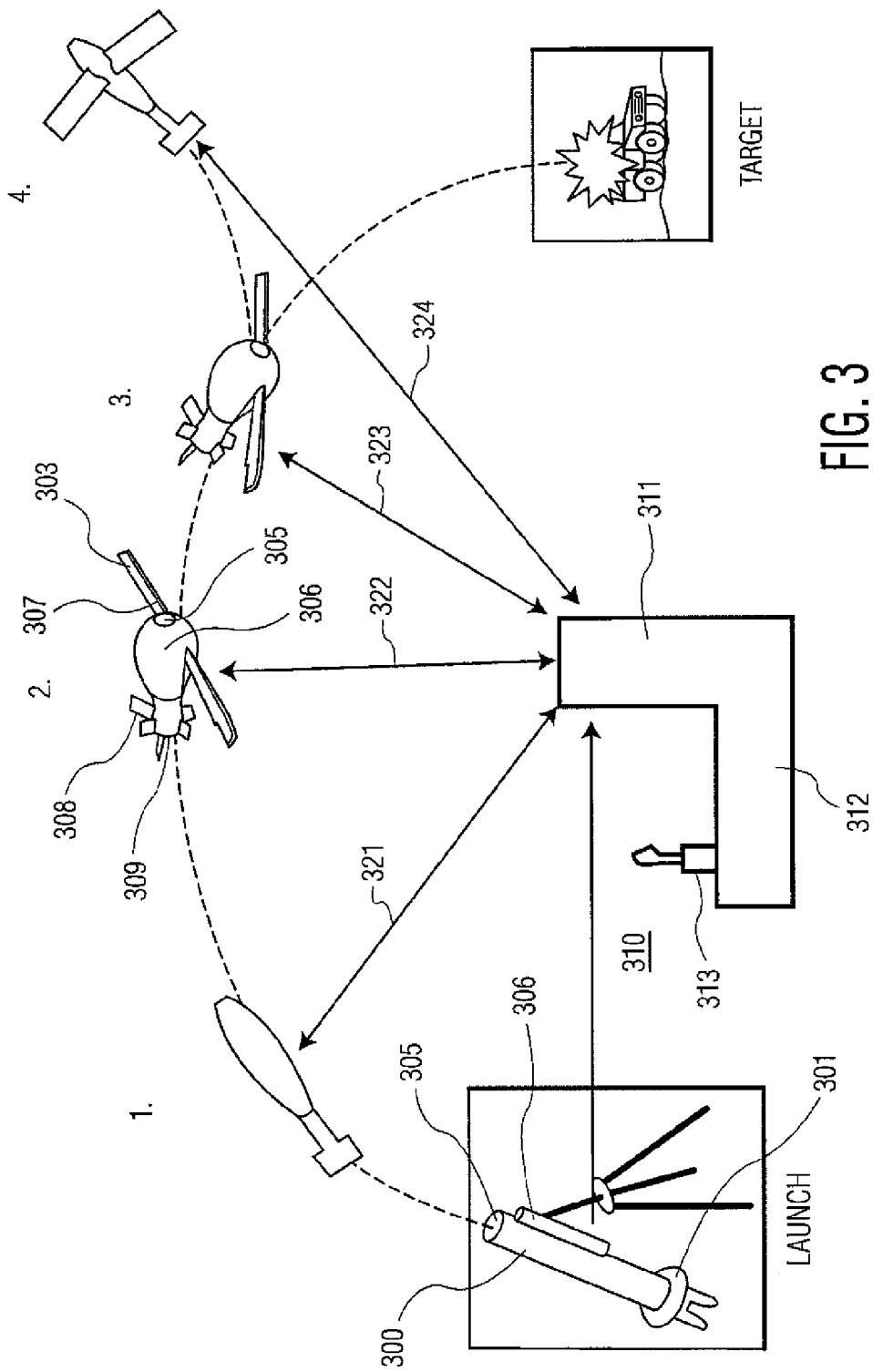
FIG. 3 illustrates flight scenario of a projectile adapted according to the invention.

FIG. 3 illustrates the flight pattern of a projectile adapted according to this invention. A round 300 is routinely launched in cannon tube 301 purportedly aimed for the target depicted there at the right side of FIG. 3. In the fore end of the round there is an RE command link means 306 and a TV means 305, however such TV means could alternatively be positioned to the rear or on a side of the round; multiple TV means could also be employed. If desired, then at position 1 in flight, the TV, 305, and command link 306 can be activated by signal 321 from ground station 310. Then if desired, a signal 322 could be sent to the projectile, commanding it to transform. This is usually done after the projectile reaches apogee or top of the flight path (position 2). In response to such transform command, the projectile will "snap out" the (on board) wings 303 and fins 308. Ground station 310 has a work station 312 for an operator to utilize, a screen 311 for viewing the TV images, and a joystick 313 for controlling the future flight of the projectile through controlling motors 307 on the wings and 309 on the fins. For example, at position 3 the operator may desire to abort continuing to the originally planned target and through command 323 have the projectile be diverted, aimed toward position 4 instead. Conversely, from position 4, a signal 324 might be sent commanding the projectile to glide back to a home position, or still glide on in toward the intended target, as may be desired. A Hybrid Projectile can even be guided by the soldier using commands from the ground station to change target while in flight, to identify battlefield assets in its view, to avoid friendly forces by changing flight path, or to self destruct in flight, or even after landing if unexploded to clear the field or to avoid its capture. As pointed out, a Hybrid Projectile ammunition cartridge can be used alongside of or in replacement of conventional ammunition with no differentiated external handling, and will fly to the target in the ordinary manner of such conventional ammunition if not otherwise guided by the soldier. Also as described herein, a Hybrid Projectile ammunition cartridge can have a selectable fuze feature for the soldier to set mission as ordinary or guided Hybrid Projectile type, before the mission is commenced.

Figure 1A:
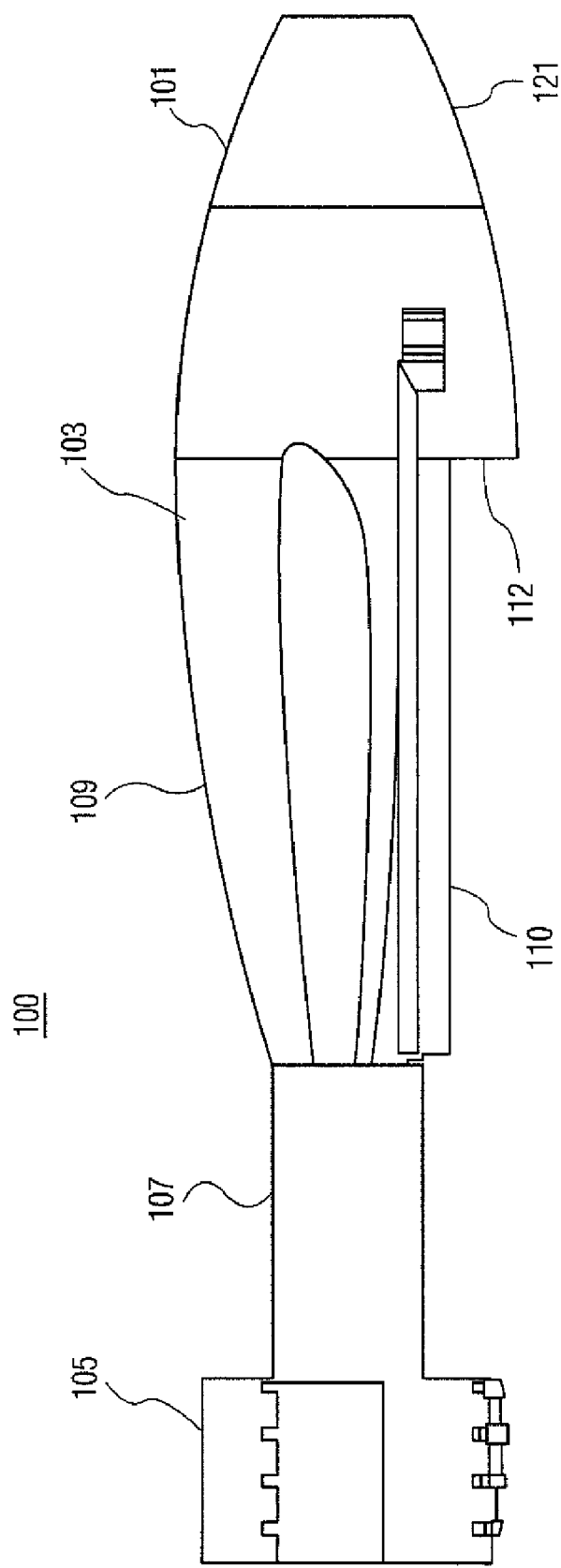
FIG. 1A and FIG. 1B illustrate a 60 MM mortar projectile adapted according to the invention.
Figure 1B:
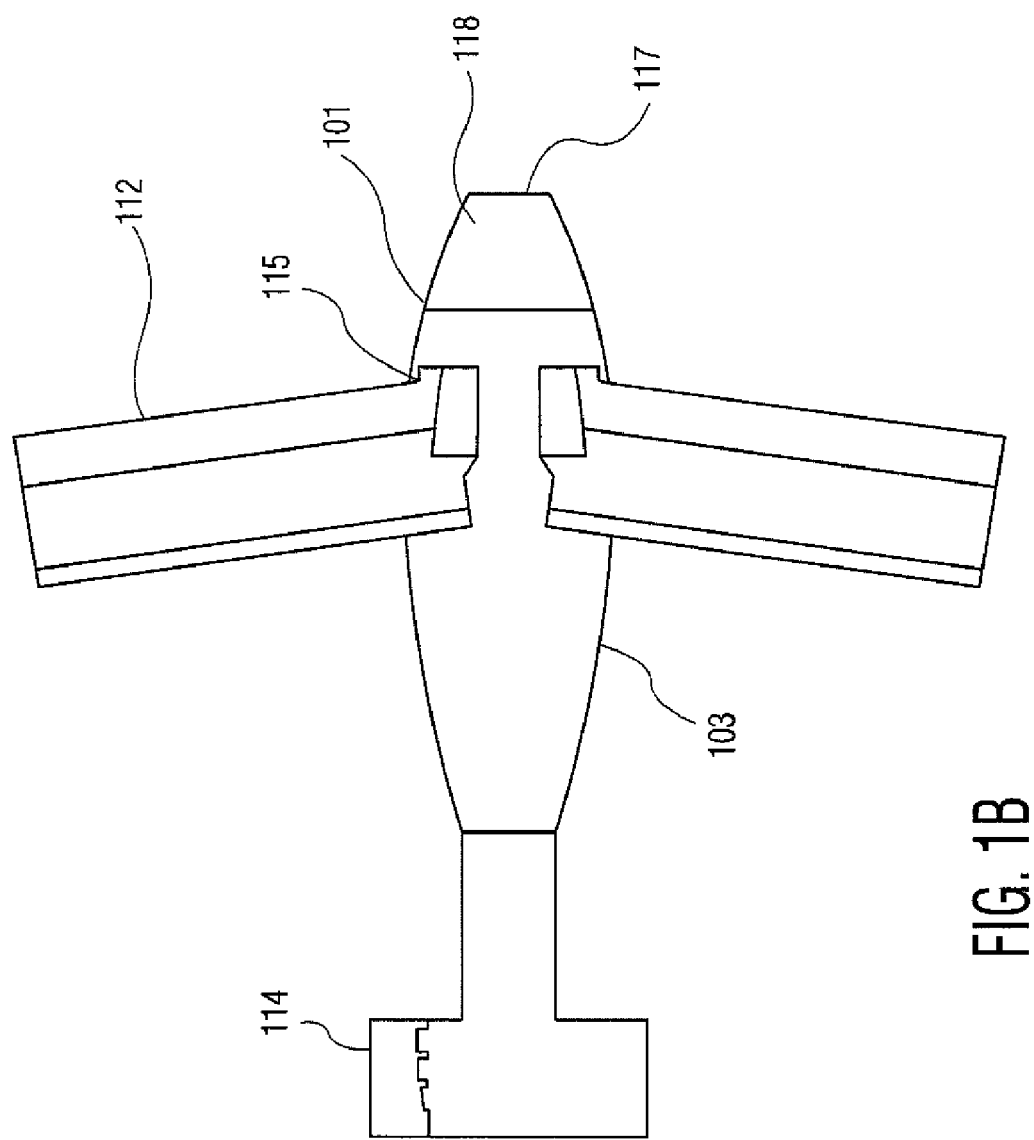

FIG. 1A shows a more or less standard 60 MM mortar projectile. It has body 109, a boom section 107, fins 105, and a front dome area 101 with fuze means 121. In body 109, the projectile carries a heavy payload 103, of high explosives intended to be delivered upon the target in normal fashion. However, this mortar projectile has been adapted with special features, shown by FIG. 1B. The front dome has a low cost TV means 117 (not fully shown) mounted in the fore, and an RF link 118 (not fully shown) for communicating to the ground station 310. The projectile also has snap out wings 112 (which can be also partially seen in FIG. 1A as section 110 of body 109 breaks away), an optional motor means 115 (not fully shown) for control gliding the wings, and (optional) snap out, more specialized, fins 114. The soldier may set the projectile's fuze 121 prior to launch for a mode of not to transform; and this will result in the ordinary use of that projectile, from launch to target without guidance as would have been provided in this invention. Or, the soldier can set the fuze to select a guidance mode as in this Hybrid Projectile.

Figure 2A:
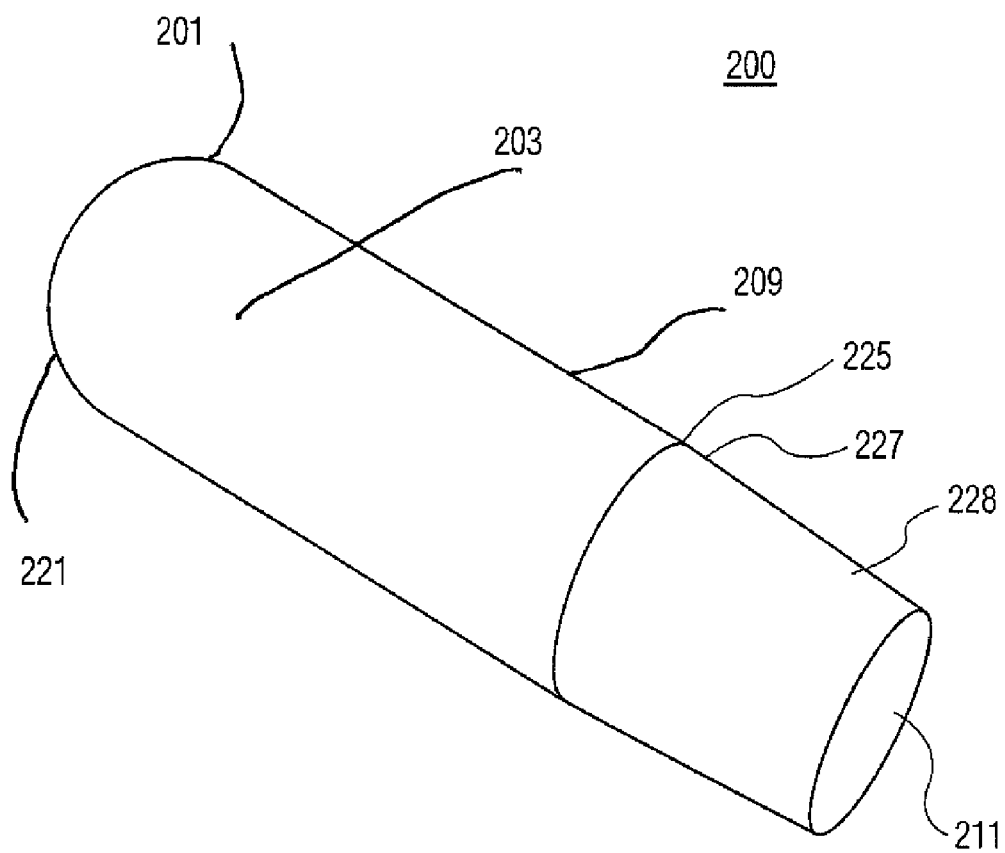
FIG. 2A and FIG. 2B illustrate a 40 MM telescoping ammunition projectile adapted according to the invention.
Figure 2B:
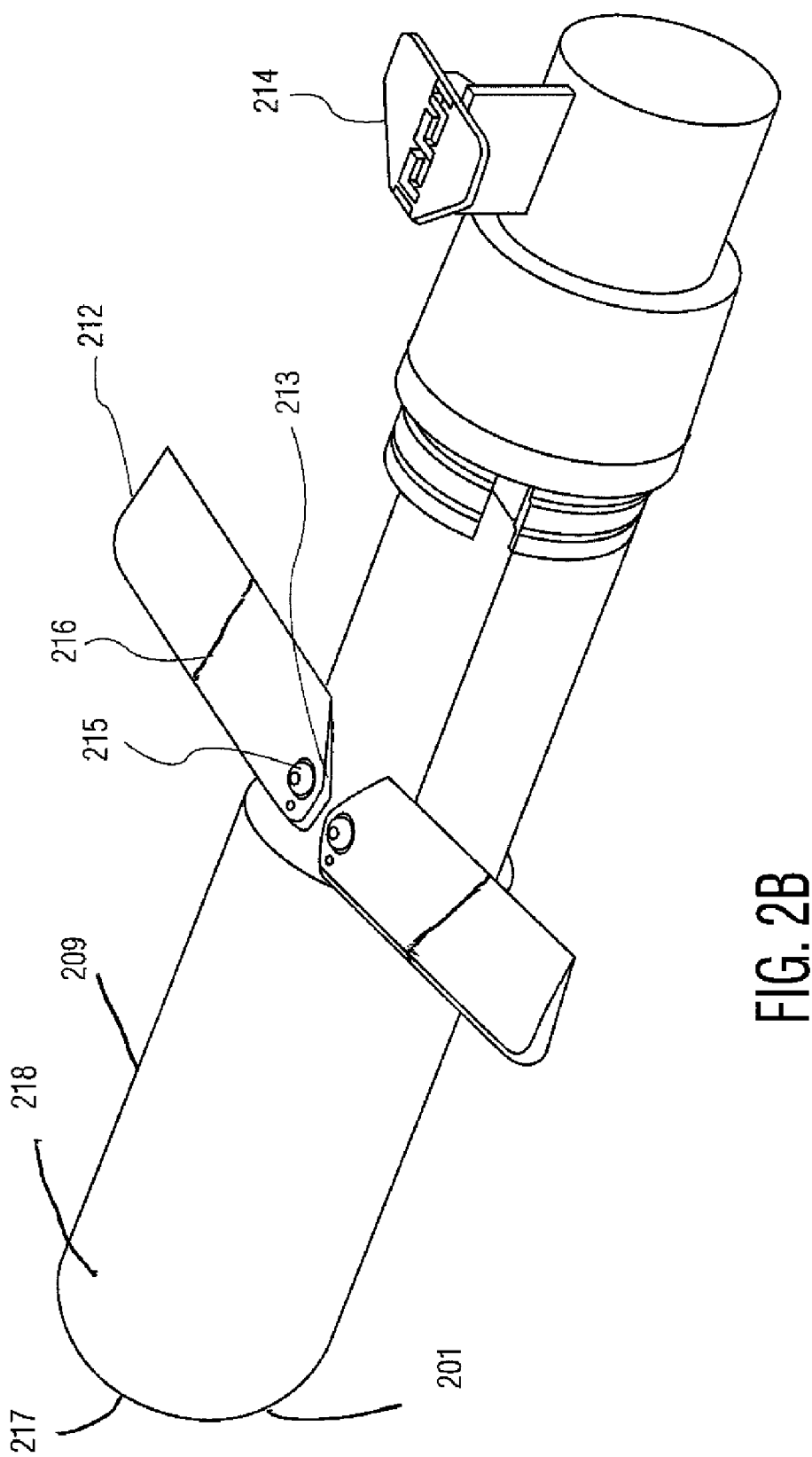

FIG. 2A shows a more or less standard 40 MM telescoping ammunition projectile. It has body 209, a front dome area 201 with fuze means 221, bourrelets 225 and 227, a rear section 228, and an aft end 211. In body 209, the projectile carries a heavy payload 203 (not fully shown) of high explosives intended to be delivered upon the target in normal fashion. However, this projectile has been adapted with special features, shown by FIG. 2B. The front dome has a TV means 217 (not fully shown) mounted in the fore and an RF link 218 (not fully shown) for communicating to the ground station 310. The projectile is shown to have snap out wings 213 hinged on 216 to further folding wings 212; however, the design more favored would be to have a telescoping array of wings disposed within one another, where the wing sections all fully extend upon command, thus providing an even larger wingspan. The projectile also provides an optional motor means 215 (not fully shown) for controlling gliding of the wings, and (optional) further snap out fins 214 (if such are the type ultimately used). Upon command to transform, body 209 telescopes out forward, leaving space for the wings to deploy, and rear section 228 telescopes rearwardly, making room for optional fins 214 to also deploy.

Figure 4A:
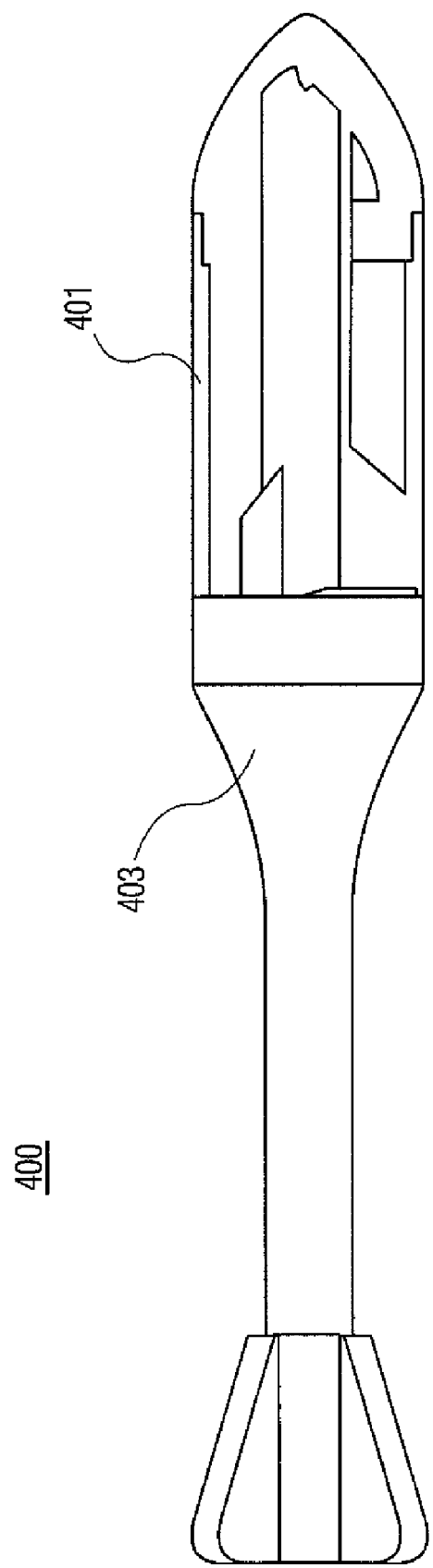
FIG. 4A and FIG. 4B illustrate a 105 MM ammunition projectile adapted with a cargo hybrid projectile according to the invention.
Figure 4B:
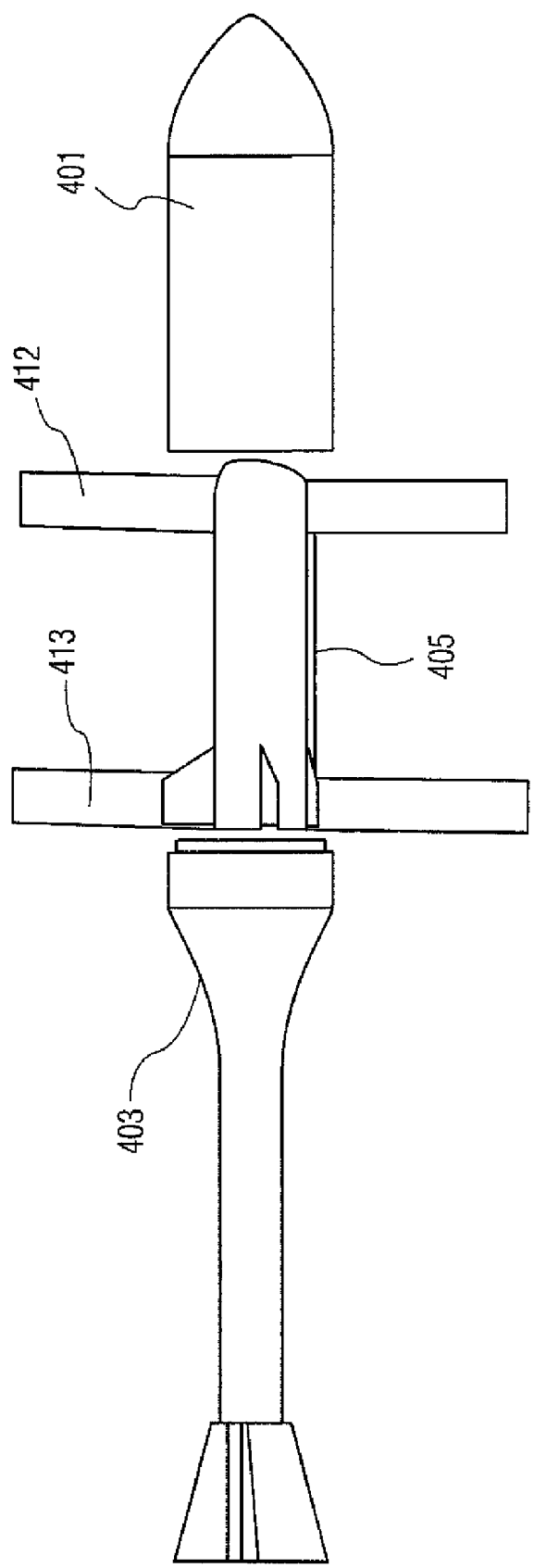

In a further embodiment in FIGS. 4A and 4B, the glidable round 405 could be stored as cargo within a large mortar projectile (105 to 120 MM caliber), or as cargo within a projectile grenade (such as 40 MM size). Then upon command from the ground station, such projectiles could simply release the glidable round. The method of release is for the body section (such as 401 and 403) of these projectiles to simply fall away, springing apart, releasing the cargo round 405 by conventional means not shown here. The cargo is the glidable round analogous to those previously shown in the figures. Wings 412 and fins 413 are made to snap out after 405 is launched. A full UAV in foldable position could be launched this way, as cargo in a relatively large projectile.

While the invention has been described with reference to certain embodiments, numerous changes, alterations and modifications to the described embodiments are possible without departing from the spirit and scope of the invention as defined in the appended claims, and equivalents thereof.

What is claimed is:

1. A Hybrid Projectile for delivering an explosive payload upon a target wherein said Hybrid Projectile is carried in a conventional ammunition cartridge, wherein the cartridge transforms in flight to present said Hybrid Projectile upon command through an RF command link, and wherein said Hybrid Projectile further comprises means for being steered during flight comprising:

wings and fins in the Hybrid Projectile which are deployed in flight upon command through the RF command link, and first electric motor means in the Hybrid Projectile for moving the wings and second electric motor means in the Hybrid Projectile for moving the fins which control the glide path of the Hybrid Projectile by moving the wings and fins upon command through the RF command link, and televisual means on the said Hybrid Projectile which through the RF command link displays the flying path of the Hybrid Projectile, and ground control means which are used to steer the flying path of the Hybrid Projectile upon command through the RE command link wherein the ground control means has a work station with a screen for viewing signals from the televisual means and a joystick for controlling the flying path of the Hybrid Projectile through controlling said first and said second electric motor means.

2. The Hybrid Projectile of claim 1 wherein the type of ammunition cartridge is selected from the group consisting of: grenade projectiles, shoulder launched projectiles, tank projectiles, mortar projectiles and telescoping ammunition projectiles.

3. The Hybrid Projectile of claim 2 wherein the Hybrid Projectile ammunition cartridge is used alongside with, or in replacement of, conventional ammunition.

4. The Hybrid Projectile of claim 2 wherein the Hybrid Projectile ammunition cartridge has a selectable fuze feature for setting the cartridge to a guided mission function.

5. The Hybrid Projectile of claim 2 wherein the Hybrid Projectile is guided using commands from the ground station to: change target while in flight, to return to approximate send location, to identify battlefield assets in its view, to avoid friendly forces by changing flight path, or to self destruct in flight or after landing.

6. The Hybrid Projectile of claim 2 wherein the Hybrid Projectile is carried as cargo in the ammunition cartridge, and the Hybrid Projectile is ejected from the ammunition cartridge upon command from the ground station.

* * * * *